(12) United States Patent
Yagi et al.

(10) Patent No.: US 9,062,181 B2
(45) Date of Patent: Jun. 23, 2015

(54) PROCESS FOR PRODUCING SILICA AND SULFUR CONTAINING RUBBER COMPOSITION

(75) Inventors: Noriko Yagi, Kobe (JP); Yasuhisa Minagawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 13/429,242

(22) Filed: Mar. 23, 2012

(65) Prior Publication Data

US 2012/0178878 A1 Jul. 12, 2012

Related U.S. Application Data

(62) Division of application No. 12/243,583, filed on Oct. 1, 2008, which is a division of application No. 11/599,289, filed on Nov. 15, 2006, now abandoned.

(30) Foreign Application Priority Data

Dec. 26, 2005 (JP) .................................. 2005-372392

(51) Int. Cl.

| | |
|---|---|
| C08K 3/36 | (2006.01) |
| C08K 9/06 | (2006.01) |
| C08K 5/548 | (2006.01) |
| C08L 7/00 | (2006.01) |
| C08L 9/06 | (2006.01) |
| B60C 1/00 | (2006.01) |
| C08K 5/541 | (2006.01) |
| C08K 5/5419 | (2006.01) |
| C08L 21/00 | (2006.01) |

(52) U.S. Cl.
CPC ... *C08K 3/36* (2013.01); *C08L 7/00* (2013.01); *C08K 5/541* (2013.01); *C08L 9/06* (2013.01); *C08L 21/00* (2013.01); *C08K 5/5419* (2013.01); *B60C 1/0016* (2013.04); *B60C 1/0025* (2013.04); *C08K 5/548* (2013.01); *C08K 9/06* (2013.01)

(58) Field of Classification Search
USPC .......................................... 523/200, 209, 213
IPC ... C08K 3/36,5/548, 9/06, 5/541, 5/5419; C08L 7/00, 9/06, 21/00; B60C 1/0025, 1/0016
See application file for complete search history.

(56) References Cited

U.S. PATENT DOCUMENTS

| | | | |
|---|---|---|---|
| 3,963,627 A | 6/1976 | Cottrell | |
| 4,076,550 A | 2/1978 | Thurn et al. | |
| 4,140,830 A | 2/1979 | Williams et al. | |
| 4,514,231 A | 4/1985 | Kerner et al. | |
| 4,704,414 A | 11/1987 | Kerner et al. | |
| 5,116,886 A | 5/1992 | Wolff et al. | |
| 5,481,015 A | 1/1996 | Nomura | |
| 5,780,531 A | 7/1998 | Scholl | |
| 6,123,762 A | 9/2000 | Barthel et al. | |
| 6,174,951 B1 | 1/2001 | Scholl | |
| 6,242,522 B1 | 6/2001 | Ezawa et al. | |
| 2001/0049023 A1 | 12/2001 | Havey et al. | |
| 2003/0226628 A1 | 12/2003 | Bailey | |
| 2005/0187332 A1 | 8/2005 | Minagawa et al. | |
| 2006/0106149 A1 | 5/2006 | Sandstrom et al. | |
| 2007/0078202 A1 | 4/2007 | Mihara et al. | |

FOREIGN PATENT DOCUMENTS

| | | |
|---|---|---|
| CN | 1657558 A | 8/2005 |
| EP | 0 941 872 A2 | 9/1999 |
| EP | 1 398 347 A1 | 3/2004 |
| EP | 1 400 660 A1 | 3/2004 |
| EP | 1398347 A1 * | 3/2004 |
| EP | 1 608 690 A1 | 2/2005 |
| EP | 1 890 829 A1 | 8/2006 |
| EP | 1690829 A1 * | 9/2006 |
| JP | 1976-20208 | 6/1976 |
| JP | 1976-28823 | 8/1976 |
| JP | 1986-31137 B2 | 7/1986 |
| JP | 5017705 A | 1/1993 |
| JP | 9328631 A | 12/1997 |
| JP | 8-245838 A | 9/1998 |
| JP | 11-180107 A | 7/1999 |
| JP | 1999-511108 A | 9/1999 |

(Continued)

OTHER PUBLICATIONS

European Search Report dated Dec. 2, 2010, Issued from corresponding EP application (EP 06023358) of U.S. Appl. No. 12/243,583.

(Continued)

*Primary Examiner* — Rabon Sergent
(74) *Attorney, Agent, or Firm* — Birch, Stewart, Kolasch & Birch, LLP

(57) ABSTRACT

A process for producing a rubber composition which includes mixing a silica and a sulfur-containing organic silicon compound represented by general formula (1):

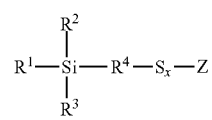

(1)

or the general formula (2):

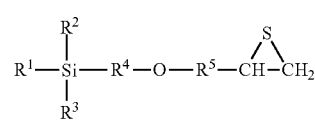

(2)

under a temperature of 130° to 180° C. to produce a surface-treated silica; and combining the surface-treated silica with a rubber component.

5 Claims, No Drawings

(56) References Cited

FOREIGN PATENT DOCUMENTS

| | | | |
|---|---|---|---|
| JP | 2001-55526 | * | 2/2001 |
| JP | 2002-155166 A | | 5/2002 |
| JP | 2003-192842 A | | 7/2003 |
| JP | 2005-298436 A | | 10/2005 |
| JP | 2005-320374 A | | 11/2005 |
| JP | 2005-338483 A | | 12/2005 |
| JP | 2005-372392 | | 12/2005 |
| WO | WO 2005-049493 A1 | | 8/2003 |

OTHER PUBLICATIONS

European Search Report issued on Nov. 23, 2011 in the corresponding EP patent (2397341) of U.S. Appl. No. 12/243,583.
Office Action (Translation in Part) dated Jan. 19, 2012 from corresponding JP application of U.S. Appl. No. 12/243,583.
Office Action dated Aug. 21, 2009 in connection with corresponding CN application of U.S. Appl. No. 12/243,583.
Office Action of Dec. 12, 2008 from corresponding CN application of U.S. Appl. No. 12/243,583.
4th Edition Lecture of Experimental Chemistry 16, Inorganic Chemistry, Japan Society of Chemistry, Jan. 20, 1993, pp. 49-54, including partial English translation.
Japanese Office Action, dated Jan. 19, 2010, for Japanese Application No. 2005-372392 with an English translation.
United States Office Action, dated Apr. 29, 2009, for U.S. Appl. No. 12/243,583.
United States Office Action, dated Oct. 25, 2012, for U.S. Appl. No. 12/243,583.

* cited by examiner

PROCESS FOR PRODUCING SILICA AND SULFUR CONTAINING RUBBER COMPOSITION

CROSS-REFERENCE TO RELATED APPLICATIONS

The present application is a divisional of U.S. application Ser. No. 12/243,583 filed Oct. 1, 2008, which in turn is a 37 C.F.R. §1.53(b) divisional of U.S. application Ser. No. 11/599,289 filed Nov. 15, 2006, which in turn claims priority on Japanese Application No. 2005-372392 filed Dec. 26, 2005. The entire contents of each of these applications is hereby incorporated by reference.

BACKGROUND OF THE INVENTION

The present invention relates to a rubber composition and a pneumatic tire using the same.

Recently, properties required for tires are diverse, including properties such as steering stability, abrasion resistance and ride quality in addition to low fuel costs, and in order to improve these performance, various devices have been made. Among these performances, in particular, both grip performance and rolling resistance property (low fuel cost performance) of a tire are properties relating to hysteresis loss of the rubber. In general, when the hysteresis loss is enlarged, grip force becomes high, and braking performance is improved, but rolling resistance is also enlarged and increase of the fuel cost is caused. Thus, since the grip performance is in antithetical relation with the rolling resistance property, various rubber compositions for a tire are proposed in order to simultaneously satisfy both properties.

For example, a method of compounding silica and a silane coupling agent has been known for the purpose of improving low exothermic property. The silane coupling agent prevents the coagulation among silica and improves processability by bonding with a silanol group on the surface of silica, and simultaneously, reduces the rolling resistance and improves abrasion resistance by chemically bonding silica and a polymer with the silane coupling agent. However, in order to attain these purposes, it is required that silica and a silane coupling agent are sufficiently reacted at a high temperature when they are kneaded, and a functional group reacting with a rubber in the silane coupling agent starts the reaction during processing such as kneading, which causes a problem that the phenomena of rubber scorch called gelation occurs. When kneading is carried out at a low temperature at which the rubber scorch does not occur, there is a problem that lowering of performance such as lowering of abrasion resistance occurs since the reaction of the silane coupling agent with silica is not adequate.

JP-A-2003-192842 discloses a rubber composition capable of improving wet grip performance without lowering the abrasion resistance and rolling resistance property by compounding a specified amount of specific anhydrous silica and hydrous silica and a pneumatic tire using the same, but it does not improve processability, and there is a room for improving rolling resistance property and wet grip performance.

SUMMARY OF THE INVENTION

An object of the present invention is to provide a rubber composition capable of improving all of processability, abrasion resistance, rolling resistance property and wet skid performance, and a pneumatic tire using the same.

The present invention relates to a rubber composition comprising 25 to 100 parts by weight of a surface-treated silica based on 100 parts by weight of a rubber component comprising a natural rubber and/or a diene synthetic rubber, said surface-treated silica being obtainable by mixing a silica and a sulfur-containing organic silicon compound represented by the general formula (1):

wherein each of $R^1$ to $R^3$ is an alkyl group or alkoxy group having 1 to 12 carbon atoms, $R^4$ is an alkylene group having 1 to 6 carbon atoms, Z is $R^1R^2R^3$—Si—$R^4$ or an alkyl group, acyl group or aryl group which have 1 to 12 carbon atoms, and $R^1$ to $R^4$ and Z may be the same or different; x represents the number of sulfur atoms at the polysulfide portion and an average value of x is 2 to 5,
or the general formula (2):

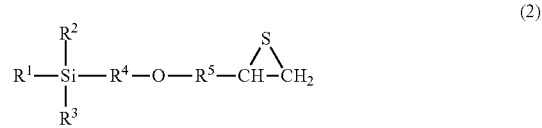

wherein each of $R^1$ to $R^3$ is an alkyl group or alkoxy group having 1 to 12 carbon atoms, each of $R^4$ and $R^5$ is an alkyl group having 1 to 6 carbon atoms, and $R^1$ to $R^5$ may be the same or different,
in an amount of 1 to 20 parts by weight of the sulfur-containing organic silicon compound on the basis of 100 parts by weight of the silica under a temperature of 130° to 180° C.

It is preferable that the surface-treated silica is extracted by a solvent, an amount of an unreacted sulfur-containing organic silicon compound contained in an extracted solution is at most 50% by weight.

It is preferable that the surface-treated silica is prepared by reacting the sulfur-containing organic silicon compound with the silica in the presence of 0.1 to 10 parts by weight of an acidic compound on the basis of 100 parts by weight of the silica.

It is preferable that the surface-treated silica is prepared by reacting the sulfur-containing organic silicon compound with the silica in the presence of 0.1 to 10 parts by weight of a basic compound on the basis of 100 parts by weight of the silica.

It is preferable that the surface-treated silica is prepared by reacting a portion of the sulfur-containing organic silicon compound with the silica in the presence of 0.1 to 10 parts by weight of an acidic compound on the basis of 100 parts by weight of the silica, and then, by reacting the residual sulfur-containing organic silicon compound with the silica in the presence of 0.1 to 10 parts by weight of a basic compound on the basis of 100 parts by weight of the silica.

It is preferable that the acidic compound and/or the basic compound is a sodium salt and/or a potassium salt.

Further, the present invention relates to a pneumatic tire which comprises the rubber composition.

DETAILED DESCRIPTION

The rubber composition of the present invention contains a rubber component and surface-treated silica.

The rubber component contains a natural rubber (NR) and/or a diene synthetic rubber.

Examples of the diene synthetic rubber are a styrene-butadiene rubber (SBR), a butadiene rubber (BR), an isoprene rubber (IR), an ethylene-propylene-diene rubber (EPDM), a chloroprene rubber (CR), an acrylonitrile-butadiene rubber (NBR) and a butyl rubber (IIR). These rubbers may be used alone and at least 2 of these may be used in combination. Among these, SBR is preferable since grip performance is improved.

When NR is contained, an amount of the NR is preferably at least 10% by weight in the rubber component, and more preferably at least 15% by weight. When the amount of NR is less than 10% by weight, compatibility with other diene rubbers is inversely deteriorated, and processability is not only lowered but also performance is possibly lowered. Further, the amount of NR is preferably at most 100% by weight, and more preferably at most 90% by weight.

A styrene unit amount of SBR is preferably at least 10% by weight, and more preferably at least 15% by weight. When the styrene unit amount of SBR is less than 10% by weight, it tends that adequate grip performance is not obtained. Further, the styrene unit amount of SBR is preferably at most 50% by weight, and more preferably at most 45% by weight. When the styrene unit amount of SBR exceeds 50% by weight, rolling resistance tends to be deteriorated.

When SBR is contained, an amount of the SBR is preferably at least 10% by weight, and more preferably at least 15% by weight. When the amount of SBR is less than 10% by weight, it tends that adequate grip performance is not obtained. Further, the amount of SBR is preferably at most 100% by weight, and more preferably at most 90% by weight.

The surface-treated silica is obtained by treating silica with a sulfur-containing organic silicon compound.

Silica includes silica prepared by a dry method or a wet method, but the preparation process of silica is not specifically limited.

A nitrogen adsorbing-specific surface area ($N_2SA$) of silica is preferably at least 40 $m^2/g$, and more preferably at least 50 $m^2/g$. When $N_2SA$ of silica is less than 40 $m^2/g$, reinforcing effect tends to be small. Further, $N_2SA$ of silica is preferably at most 400 $m^2/g$, and more preferably at most 380 $m^2/g$. When $N_2SA$ of silica exceeds 400 $m^2/g$, dispersibility is lowered, and the exothermic property of the rubber component tends to be increased.

Since a reaction of silica with a sulfur-containing organic silicon compound is a hydrolysis reaction, a certain degree of moisture is required. However, since silica adsorbs moisture in the air, there is possibility that a water content is not constant depending on surrounding environments. In such a case, the reproducible reaction of silica with the sulfur-containing organic silicon compound is not only carried out, but also the storage stability of the surface-treated silica tends to be deteriorated; thus, it is preferable that the water content of silica is adjusted at 1 to 6%. When the water content is less than 1%, it tends that a hydrolysis reaction does not proceed adequately, and when it exceeds 6%, stability during storage tends to be deteriorated.

Adjustment of the water content of silica may be carried out by only silica or may be carried out in the presence of an acidic compound or a basic compound described later. A process of adjusting the water content of silica is not specifically limited, but an example is a process of heating treatment on silica at 100 to 130° C. for 10 minutes to 3 hours. The heating treatment may be carried out by leaving silica still in a dryer, or it may be carried out while stirring it in a mixing machine equipped with a stirring blade and a heating machine.

The sulfur-containing organic silicon compound is a compound represented by the following general formula (1) or (2):

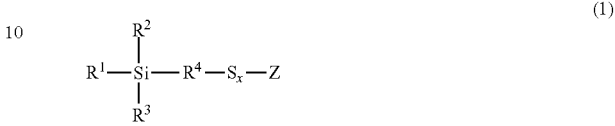

(1)

(wherein $R^1$ to $R^3$ are an alkyl group or alkoxy group having 1 to 12 carbons, $R^4$ is an alkyl group having 1 to 6 carbons, Z is $R^1R^2R^3$—Si—$R^4$ or an alkyl group having 1 to 12 carbons, an acyl group or an aryl group, and $R^1$ to $R^4$ and Z may be respectively the same or different. Further, X represents the number of a sulfur atom at a polysulfide portion, and an average value of X is 2 to 5).

In the formula (1), $R^1$ to $R^3$ are preferably an alkyl group or an alkoxy group. When $R^1$ to $R^3$ are an alkyl group, the number of carbons is preferably 1 to 10. Further, when $R^1$ to $R^3$ are an alkoxy group, the number of carbons is preferably 1 to 6. When the numbers of carbons in $R^1$ to $R^3$ respectively exceed the upper limit, reactivity with silica tends to be lowered.

$R^4$ is preferably an alkyl group. The number of carbons in $R^4$ is preferably 1 to 6, and more preferably 1 to 4. When the number of carbons in $R^4$ exceeds 6, function as a coupling agent tends to be lowered.

Z is preferably $R^1R^2R^3$—Si—$R^4$—, an alkyl group, an acyl group or an aryl group. When Z is $R^1R^2R^3$—Si—$R^4$, $R^1$ to $R^4$ can be the same as described above, such that $R^1$ to $R^3$ are an alkyl group or alkoxy group having 1 to 12 carbons and $R^4$ is an alkyl group having 1 to 6 carbons. When Z is an alkyl group, an acyl group or an aryl group, the number of carbons in Z is preferably 1 to 12, and more preferably 2 to 10. When the number of carbons in Z exceeds 12, function as a coupling agent tends to be lowered.

X represents the number of sulfur atoms at a polysulfide portion and an average value of X is preferably 2 to 5. When the average value of X is less than 2, reactivity with a rubber tends to be low, and when it exceeds 5, it tends that rubber scorch is easily generated during processing.

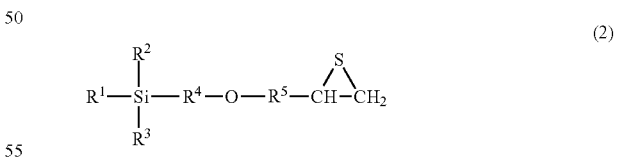

(2)

(wherein $R^1$ to $R^3$ are an alkyl group or alkoxy group having 1 to 12 carbons, $R^4$ and $R^5$ are an alkyl group having 1 to 6 carbons, and $R^1$ to $R^5$ may be respectively the same or different)

In the formula (2), $R^1$ to $R^3$ are preferably an alkyl group or an alkoxy group. When $R^1$ to $R^3$ are an alkyl group, the number of carbons is preferably 1 to 10. Further, when $R^1$ to $R^3$ are an alkoxy group, the number of carbons is preferably 1 to 6. When the numbers of carbons in $R^1$ to $R^3$ respectively exceed the upper limit, reactivity with silica tends to be lowered.

$R^4$ and $R^5$ are preferably an alkyl group. Further, the numbers of carbons in $R^4$ and $R^5$ are preferably 1 to 6, and more preferably 1 to 4. When the numbers of carbons in $R^4$ and $R^5$ exceed 6, function as a coupling agent tends to be lowered.

Examples of such sulfur-containing organic silicon compound are sulfides such as bis(3-triethoxysilylpropyl)tetrasulfide (such as Si69 available from Degussa Corporation), bis(2-triethoxysilylethyl)tetrasulfide; bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, bis(2-triethoxysilylethyl)disulfide, bis(2-trimethoxysilylethyl)disulfide, bis(3-diethoxymethylsilylpropyl)tetrasulfide, bis(3-dimethoxymethylsilylpropyl)tetrasulfide, bis(3-diethoxymethylsilylpropyl)disulfide and bis(3-dimethoxymethylsilylpropyl)disulfide. These sulfur-containing organic silicon compounds may be used alone and at least 2 of these may be used in combination.

An amount of the sulfur-containing organic silicon compound to be reacted is at least 1 part by weight based on 100 parts by weight of silica, and preferably at least 1.5 parts by weight. When the amount of the sulfur-containing organic silicon compound is less than 1 part by weight, effects of surface treatment by mixing the sulfur-containing organic silicon compound is not adequate and processability is lowered. Further, the amount of the sulfur-containing organic silicon compound is at most 20 parts by weight, and preferably at most 15 parts by weight. When the amount of the sulfur-containing organic silicon compound exceeds 20 parts by weight, effects of improving performance is not only small, but also processability is lowered by the sulfur-containing organic silicon compound untreated on the surface of silica, nevertheless the cost is increased.

In the present invention, the reaction rate of silica with the sulfur-containing organic silicon compound is controlled by a hydrolysis reaction. In order to carry out the hydrolysis reaction rapidly, it is preferable that the surface-treated silica is prepared by reacting them in the presence of an acidic compound and/or a basic compound.

The acidic compound and the basic compound may be added as they are or may be added as an aqueous solution.

When the acidic compound is dissolved in water, its pH is preferably at least 2. When pH is less than 2, a problem is not only generated on the safety in operations, but also a mixing machine etc tend to be polluted. Further, pH is preferably at most 6.5. When pH exceeds 6.5, effects of promoting the hydrolysis reaction tends to be small.

As such acidic compound, examples are sodium salts such as sodium dihydrogen phosphate, sodium phosphate monobasic and sodium citrate; potassium salts such as potassium dihydrogen phosphate, potassium phosphate monobasic, potassium citrate monobasic and potassium hydrogen phthalate; ammonium salts such as ammonium phosphate monobasic and diammonium citrate; acids such as hydrochloric acid, sulfuric acid, nitric acid, phosphoric acid, acetic acid, oxalic acid, adipic acid, glycolic acid, benzoic acid and salicylic acid. These acidic compounds may be used alone, or at least 2 of these may be used in combination. Among these, sodium salts and/or potassium salts are preferable from the viewpoint of being excellent in the effect of promoting the hydrolysis reaction and safety, sodium salts are more preferable, and sodium dihydrogen phosphate is further more preferable.

When the basic compound is dissolved in water, its pH is preferably at least 8. When pH is less than 8, the effect of promoting the hydrolysis reaction tends to be small. Further, pH is preferably at most 12. When pH exceeds 12, it tends that a problem is caused on the safety in operations.

As such basic compound, examples are sodium salts such as sodium carbonate, sodium hydrogen carbonate, disodium hydrogen phosphate, sodium borate, sodium acetate, sodium stearate and sodium oleate; potassium salts such as potassium carbonate, potassium hydrogen carbonate, dipotassium hydrogen phosphate, potassium borate, potassium acetate and potassium oleate. These basic compounds may be used alone, or at least 2 of these may be used in combination. Among these, potassium salts are preferable from the viewpoint of being excellent in the effect of promoting the hydrolysis reaction and safety, and potassium borate is more preferable.

When the surface-treated silica is prepared in the presence of the acidic compound, an amount of the acidic compound is preferably at least 0.1 part by weight based on 100 parts by weight of silica, and more preferably at least 0.5 part by weight. When the amount of the acidic compound is less than 0.1 part by weight, the effect of promoting the hydrolysis reaction by the acidic compound tends to be insufficient. Further, the amount of the acidic compound is preferably at most 10 parts by weight, and more preferably at most 8 parts by weight. When the amount of the acidic compound exceeds 10 parts by weight, the hydrolysis reaction is promoted more than necessity, and the sulfur-containing organic silicon compounds tend to be mutually condensed.

When the surface-treated silica is prepared in the presence of the basic compound, an amount of the basic compound is preferably at least 0.1 part by weight based on 100 parts by weight of silica, and more preferably at least 0.5 part by weight. When the amount of the basic compound is less than 0.1 part by weight, the effect of promoting the hydrolysis reaction by the basic compound tends to be insufficient. Further, the amount of the basic compound is preferably at most 10 parts by weight, and more preferably at most 8 parts by weight. When the amount of the basic compound exceeds 10 parts by weight, the hydrolysis reaction is promoted more than necessity, and the sulfur-containing organic silicon compounds tend to be mutually condensed.

When a large amount of the sulfur-containing organic silicon compound is added in the presence of the acidic compound or the basic compound, the sulfur-containing organic silicon compounds are mutually condensed; thus, the hydrolysis reaction with silica is not only proceeded adequately, but also the condensation causes the lowering of processability. Further, the unreacted sulfur-containing organic silicon compound also causes a problem on safety such that it is evaporated during storage. Accordingly, it is preferable that a small amount of the sulfur-containing organic silicon compound is mixed with silica in the presence of the acidic compound to treat the surface of silica with the sulfur-containing organic silicon compound, thereafter, mixing the residual sulfur-containing organic silicon compound in the presence of the basic compound.

When the surface of silica is treated with the sulfur-containing organic silicon compound in the presence of the acidic compound, and then, the residual sulfur-containing organic silicon compound is mixed with silica in the presence of the basic compound, an amount of the sulfur-containing organic silicon compound added in the presence of the acidic compound among the whole sulfur-containing organic silicon compound is preferably at least 5% by weight, and more preferably at least 10% by weight. When the amount of the sulfur-containing organic silicon compound is less than 5% by weight, it tends to be difficult that the surface of whole silica is homogeneously treated. Further, the amount of the sulfur-containing organic silicon compound is preferably at most 80% by weight, and more preferably at most 60% by weight. When the amount of the sulfur-containing organic silicon compound exceeds 80% by weight, since condensation among the sulfur-containing organic silicon compounds simultaneously occurs, it tends to be difficult that the surface of whole silica is homogeneously treated.

An untreated amount of the sulfur-containing organic silicon compound contained in a solvent extracted solution of the surface-treated silica is preferably at most 50% by weight. When the untreated amount exceeds 50% by weight, improvement effects of performances such as low fuel cost and abrasion resistance are not only sufficient, but also processability is lowered.

A preparation process of the surface-treated silica is not specifically limited, and examples are a process of mechanically mixing or a process of removing a solvent after mixing in a solution.

A mixing temperature at which the surface-treated silica is prepared by mixing silica with the sulfur-containing organic silicon compound is at least 130° C., and preferably at least 135° C. When the mixing temperature is less than 130° C., since the reaction of silica with an unreacted alkoxy group and the untreated sulfur-containing organic silicon compound is not sufficient, there is possibility to bring adverse effects on processability and performances. Further, the mixing temperature is at most 180° C., and preferably at most 175° C. When the mixing temperature exceeds 180° C., there is fear that rubber scorch is generated.

An amount of the surface-treated silica is at least 25 parts by weight based on 100 parts by weight of the rubber component, and preferably at least 30 parts by weight. When the amount of silica is less than 25 parts by weight, sufficient low exothermic property and wet grip property are not obtained. Further, the amount of the surface-treated silica is at most 100 parts by weight, preferably at most 90 parts by weight, and more preferably at most 80 parts by weight. When the amount of the surface-treated silica exceeds 100 parts by weight, processability and workability are deteriorated.

The rubber composition of the present invention may suitably compound compounding agents usually used in the rubber industry if necessary, for example, fillers for reinforcement such as carbon black and silica, a silane coupling agent, a softening agent, an antioxidant, an antiozonant, peroxides, zinc oxide, stearic acid, a vulcanizing agent such as sulfur, and a vulcanization accelerator, in addition to the rubber component and the surface-treated silica.

The rubber composition of the present invention is preferably used as a rubber composition for uses such as a tread, a sidewall, a carcass ply and a belt ply.

The pneumatic tire of the present invention is prepared by a usual process using the rubber composition of the present invention. Namely, the rubber composition, of the present invention in which the above-described various chemicals are compounded if necessary is extrusion-processed adjusting with the shape of each tire part at an unvulcanization stage, and molded on a tire molding machine by a usual process to form an unvulcanized tire. The unvulcanized tire is heated and pressurized in a vulcanizer to obtained the pneumatic tire of the present invention.

The pneumatic tire of the present invention prepared in this manner is preferably used for a bus, an autotruck, an automobile and the like.

EXAMPLES

The present invention is specifically explained based on Examples, but the present invention is not limited only thereto.

Then, various chemicals used in Examples and Comparative Examples are collectively explained in the following.
Natural rubber (NR): RSS#3
Styrene-butadiene rubber (SBR): SBR 1502 (styrene unit amount: 23.5% by weight) available from JSR Corporation
Silica: NIPSIL ER ($N_2SA$: 110 $m^2/g$) available from Tosoh Silica Corporation
Silane coupling agent A: Si69 (bis(3-triethoxysilylpropyl) tetrasulfide) available from Degussa Corporation
Silane coupling agent B: prepared by the following preparation process
Surface-treated silica 1: prepared by the following preparation process (untreated amount: 41.8% by weight)
Surface-treated silica 2: prepared by the following preparation process (untreated amount: 14.9% by weight)
Surface-treated silica 3: prepared by the following preparation method (untreated amount: 7.1% by weight)
Surface-treated silica 4: prepared by the following preparation method (untreated amount: 37.1% by weight)
Process oil: DIANA PROCESS OIL PS323 available from Idemitsu Kosan Co., Ltd.
Antioxidant: NOCRAC 6C (N-1,3-dimethylbutyl-N'-phenyl-p-phenylenediamine) available from OUCHI SHINKO CHEMICAL INDUSTRIAL CO., LTD.
Stearic acid: available from NOF Corporation
Zinc oxide: ZINC OXIDE NO.1 available from Mitsui Mining & Smelting Co., Ltd.
Sulfur: SULFUR POWDER available from Tsurumi Chemical Industry Co., Ltd.
Vulcanization accelerator TBBS: NOCCELER NS (N-tert-butyl-2-benzothiazolylsulfenamide) available from OUCHI SHINKO CHEMICAL INDUSTRIAL CO., LTD.
Vulcanization accelerator DPG: NOCCELER D (1,3-diphenylguanidine) available from OUCHI SHINKO CHEMICAL INDUSTRIAL CO., LTD.
(Preparation of Silane Coupling Agent B)

A 1 L-separable flask was charged with 100 g of 3-glycidoxypropyltriethoxysilane (KBE 403 available from Shin-Etsu Chemical Co., Ltd) and 41 g of thiourea (available from Wako Pure Chemical Industries, Ltd.), after the atmosphere was adequately replaced with nitrogen, 150 ml of anhydrous ethanol was added thereto, and the mixture was stirred at a room temperature for 24 hours. A solution after completion of the reaction was filtered and ethanol was removed by distillation to prepare silane coupling agent B.
(Preparation of Surface-Treated Silica 1)

1 kg of silica was added into a Henschel mixer and mixed at a room temperature for 1 minute, then 80 g of the silane coupling agent A was added thereto, and the mixture was mixed at 130° C. for 30 minutes to prepare surface-treated silica 1.
(Preparation of Surface-Treated Silica 2)

1 kg of silica was added into a Henschel mixer and mixed at 105° C. for 30 minutes, then 80 g of the silane coupling agent A was added thereto, and the mixture was mixed at 130° C. for 30 minutes to prepare surface-treated silica 2.
(Preparation of Surface-Treated Silica 3)

1 kg of silica and 8 g of sodium dihydrogen phosphate dihydrate (pH in a state of an aqueous solution: 4.25) were added into a Henschel mixer and mixed at 105° C. for 30 minutes, then 8 g of the silane coupling agent A was added thereto, and the mixture was mixed at 130° C. for 30 minutes. Then 4 g of potassium tetraborate decahydrate (pH at aqueous solution: 9.2) and 72 g of the silane coupling agent A were added, and the mixture was mixed at 130° C. for 30 minutes to prepare surface-treated silica 3.

(Preparation of Surface-Treated Silica 4)

1 kg of silica was added into a Henschel mixer and mixed at a room temperature for 1 minute, then 80 g of the silane coupling agent B was added thereto, and the mixture was mixed at 130° C. for 30 minutes to prepare the surface-treated silica 4.

Examples 1 to 4 and Comparative Examples 1 and 2

According to the compounding prescription shown in Table 1, chemicals other than sulfur and a vulcanization accelerator were kneaded at 135° C. for 5 minutes using a Banbury mixer to obtain a kneaded product. Then, the kneaded product was kneaded at 50° C. for 5 minutes using an open roll to obtain an unvulcanized rubber composition. Further, the unvulcanized rubber composition was vulcanized by press at 170° C. for 20 minutes to obtain vulcanized rubber compositions of Examples 1 to 4 and Comparative Examples 1 and 2.

(Processability)

A Mooney viscosity ($ML_{1+4}$/130° C.) of the unvulcanized rubber composition at the time when 4 minutes passed after a small rotor was rotated under a temperature condition of 130° C. preliminarily heated for 1 minute was measured using a Mooney viscosity tester in accordance with JIS K 6300 "Unvulcanized rubbers—Physical properties—The first section: Method of Finding Viscosity and Scorch Time by Mooney Viscosity Tester", and the Mooney viscosity of each composition was expressed by an index according to the following calculation formula, referring the Mooney viscosity index of Comparative Example 1 to as 100. Further, it indicates that the larger the Mooney viscosity index is, the smaller the Mooney viscosity is and the more excellent processability is.

(Mooney viscosity index)=(Mooney viscosity of Comparative Example 1)÷(Mooney viscosity of each composition)×100

(Abrasion Resistance)

Lambourn abrasion amount was measured under the conditions of a temperature at 20° C., a slip rate at 20% and a test time for 5 minutes, using a Lambourn abrasion tester. Further, a volume loss was calculated from the measured Lambourn abrasion amount, the volume loss of each composition was expressed by an index according to the following calculation formula referring the Lambourn abrasion index of Comparative Example 1 to as 100.

(Lambourn abrasion index)=(Volume loss of Comparative Example 1)÷(Volume loss of each composition)×100

(Rolling Resistance)

A loss tangent (tan δ) was measured under the conditions of a temperature at 70° C., an initial stain at 10% and a dynamic strain at 2%, using a viscoelasticity spectrometer VES (manufactured by Iwamoto Seisakusyo K.K.). Tan δ of each composition was expressed by an index according to the following calculation formula, referring the rolling resistance index of Comparative Example 1 to as 100. Further, it indicates that the larger the rolling resistance index is, the lower the rolling resistance is, and more excellent it is.

(Rolling resistance index)=(Tan δ of Comparative Example 1)/(Tan δ of each composition×100

(Wet Skid Performance)

Skid resistance at 25° C. was measured in accordance with the method of ASTM E303-83, using a portable skid tester manufactured by Stanley Works, Ltd. The skid resistance of each composition was expressed by an index according to the following calculation formula, referring the wet skid performance index of Comparative Example 1 to as 100. Further, it indicates that the larger the wet skid performance index is, the more excellent the wet skid performance is.

(Wet skid performance index)=(Skid resistance of each composition)÷(Skid resistance of Comparative Example 1)×100

The above-described test results are shown in Table 1.

TABLE 1

| | Ex. | | | | Com. Ex. | |
|---|---|---|---|---|---|---|
| | 1 | 2 | 3 | 4 | 1 | 2 |
| Amounts (part by weight) | | | | | | |
| NR | 30 | 30 | 30 | 30 | 30 | 30 |
| SBR | 70 | 70 | 70 | 70 | 70 | 70 |
| Silica | — | — | — | — | 60 | 60 |
| Silane coupling agent A | — | — | — | — | 4.8 | — |
| Silane coupling agent B | — | — | — | — | — | 4.8 |
| Surface-treated silica 1 | 64.8 | — | — | — | — | — |
| Surface-treated silica 2 | — | 64.8 | — | — | — | — |
| Surface-treated silica 3 | — | — | 64.8 | — | — | — |
| Surface-treated silica 4 | — | — | — | 64.8 | — | — |
| Process oil | 10 | 10 | 10 | 10 | 10 | 10 |
| Antioxidant | 1 | 1 | 1 | 1 | 1 | 1 |
| Stearic acid | 2 | 2 | 2 | 2 | 2 | 2 |
| Zinc oxide | 3 | 3 | 3 | 3 | 3 | 3 |
| Sulfur | 1.5 | 1.5 | 1.5 | 1.5 | 1.5 | 1.5 |
| Vulcanization accelerator TBBS | 1 | 1 | 1 | 1 | 1 | 1 |
| Vulcanization accelerator DPG | 1 | 1 | 1 | 1 | 1 | 1 |
| Evaluation results | | | | | | |
| Mooney viscosity index | 98 | 101 | 102 | 102 | 100 | 100 |
| Lambourn abrasion index | 100 | 105 | 106 | 100 | 100 | 87 |
| Rolling resistance index | 102 | 105 | 108 | 101 | 100 | 102 |
| Wet skid performance index | 105 | 107 | 111 | 101 | 100 | 101 |

According to the present invention, there can be provided a rubber composition capable of improving all of processability, abrasion resistance, rolling resistance property and wet skid performance by compounding specified amounts of a rubber component and a surface-treated silica obtained by preliminarily mixing specified amounts of silica and a sulfur-containing organic silicon compound, and a pneumatic tire using the same.

What is claimed is:

1. A process for producing a rubber composition, which comprises:
heat-treating a silica at 105° to 130° C. to adjust the water content of the silica, and then
mixing said heat-treated silica and a sulfur-containing organic silicon compound represented by the general formula (1):

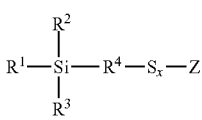

(1)

wherein each of $R^1$ to $R^3$ is independently an alkyl group or alkoxy group having 1 to 12 carbon atoms, $R^4$ is an alkylene group having 1 to 6 carbon atoms, Z is $R^1R^2R^3$—Si—$R^4$— or an alkyl group, acyl group or aryl group which have 1 to 12 carbon atoms; x represents the number of sulfur atoms at the polysulfide portion and an average value of x is 2 to 5, in an amount of 1 to 20 parts by weight of said a sulfur-containing organic silicon compound on the basis of 100 parts by weight of said silica under a temperature of 130° to 180° C. to produce a surface-treated silica; and combining said surface-treated silica with a rubber component comprising 10 to 90% by weight of a natural rubber and 10 to 90% by weight of a styrene-butadiene rubber to form a rubber composition comprising 25 to 100 parts by weight of the surface-treated silica based on 100 parts by weight of the rubber component wherein the surface-treated silica is prepared by reacting a portion of the sulfur-containing organic silicon compound with said silica in the presence of 0.1 to 10 parts by weight of an acidic sodium salt compound on the basis of 100 parts by weight of said silica, and then, by reacting the residual sulfur-containing organic silicon compound with said silica in the presence of 0.1 to 10 parts by weight of a basic potassium salt compound on the basis of 100 parts by weight of said silica.

2. The process of claim 1, wherein said surface-treated silica is subjected to extraction by a solvent, and the amount of unreacted sulfur-containing organic silicon compound contained in the extracted solution is at most 50% by weight based on the original amount of the sulfur-containing organic silicon compound.

3. The process of claim 1, wherein the acidic sodium salt compound is sodium dihydrogen phosphate and the basic potassium salt compound is potassium borate.

4. The process of Class 1, wherein an amount of the sulfur-containing organic silicon compound reacted in the presence of the acidic compound is 5 to 80% by weight based on the whole sulfur-containing organic silicon containing compound.

5. A pneumatic tire which comprises the rubber composition produced by the process of claim 1.

* * * * *